(12) United States Patent
Sarachik et al.

(10) Patent No.: US 7,913,286 B2
(45) Date of Patent: Mar. 22, 2011

(54) SYSTEM AND METHOD FOR DESCRIBING PRESENTATION AND BEHAVIOR INFORMATION IN AN ITV APPLICATION

(75) Inventors: Karen Sarachik, Los Angeles, CA (US);
Jon Dakss, Marina del Rey, CA (US);
Jeff Gorder, Santa Monica, CA (US)

(73) Assignee: Ericsson Television, Inc., Duluth, GA (US)

( * ) Notice: Subject to any disclaimer, the term of this patent is extended or adjusted under 35 U.S.C. 154(b) by 1695 days.

(21) Appl. No.: 11/070,698

(22) Filed: Mar. 1, 2005

(65) Prior Publication Data
US 2006/0031918 A1 Feb. 9, 2006

Related U.S. Application Data

(63) Continuation-in-part of application No. 09/694,079, filed on Oct. 20, 2000, now Pat. No. 7,367,042.

(60) Provisional application No. 60/548,997, filed on Mar. 1, 2004, provisional application No. 60/634,757, filed on Dec. 9, 2004.

(51) Int. Cl.
*H04N 7/16* (2006.01)
(52) U.S. Cl. ........ 725/135; 725/136; 725/137; 725/138; 725/139; 725/140; 725/37; 725/60; 725/61
(58) Field of Classification Search .......... 725/135–140, 725/37, 60–61
See application file for complete search history.

(56) References Cited

U.S. PATENT DOCUMENTS

| | | | |
|---|---|---|---|
| 5,774,664 A | 6/1998 | Hidary et al. | |
| 5,861,881 A * | 1/1999 | Freeman et al. | 715/201 |
| 5,889,746 A | 3/1999 | Moriyama et al. | |
| 5,903,816 A * | 5/1999 | Broadwin et al. | 725/110 |
| 5,969,715 A * | 10/1999 | Dougherty et al. | 725/110 |
| 6,005,561 A * | 12/1999 | Hawkins et al. | 715/234 |

(Continued)

FOREIGN PATENT DOCUMENTS
EP  1117257 A  7/2001
(Continued)

OTHER PUBLICATIONS

International Search Report and Written Opinion dated Mar. 29, 2007 for International application No. PCT/US05/06804, 6 sheets.

(Continued)

*Primary Examiner* — Christopher Kelley
*Assistant Examiner* — Mulugeta Mengesha

(57) ABSTRACT

An ITV application definition language (ADL) used to generate ITV applications for different types of target platforms and devices. The ADL provides a plurality of core data structure types upon which one or more data structures may be built. Data structures storing ITV content presentation and behavior information are referred to as resources. A resource is associated with a globally unique identifier that allows the data structure to be efficiently stored and retrieved from a hash table. A resource is also associated with an expiration time stamp that indicates when the resource is to be freed from memory. A resource is of arbitrary length, and contains values that differ from the default values stored at a receiving client device. Resources are also packaged into a module that may be catered to a platform and/or profile of a receiving client. The client may quickly determine whether the module is relevant to it by examining the platform and/or profile ID contained in a header of the module.

20 Claims, 17 Drawing Sheets

U.S. PATENT DOCUMENTS

| | | | | |
|---|---|---|---|---|
| 6,018,768 A | * | 1/2000 | Ullman et al. | 709/218 |
| 6,078,926 A | * | 6/2000 | Jensen et al. | 1/1 |
| 6,137,549 A | * | 10/2000 | Rasson et al. | 725/37 |
| 6,173,317 B1 | * | 1/2001 | Chaddha et al. | 709/219 |
| 6,230,159 B1 | * | 5/2001 | Golde | 1/1 |
| 6,240,555 B1 | * | 5/2001 | Shoff et al. | 725/110 |
| 6,275,989 B1 | * | 8/2001 | Broadwin et al. | 725/37 |
| 6,282,713 B1 | | 8/2001 | Kitsukawa et al. | |
| 6,317,796 B1 | * | 11/2001 | Bak et al. | 719/315 |
| 6,349,410 B1 | * | 2/2002 | Lortz | 725/110 |
| 6,374,336 B1 | * | 4/2002 | Peters et al. | 711/167 |
| 6,374,405 B1 | * | 4/2002 | Willard | 725/94 |
| 6,392,664 B1 | | 5/2002 | White et al. | |
| 6,415,438 B1 | | 7/2002 | Blackketter et al. | |
| 6,460,180 B1 | * | 10/2002 | Park et al. | 725/40 |
| 6,496,981 B1 | | 12/2002 | Wistendahl | |
| 6,560,777 B2 | * | 5/2003 | Blackketter et al. | 725/110 |
| 6,574,795 B1 | * | 6/2003 | Carr | 725/71 |
| 6,598,224 B1 | * | 7/2003 | Maeda et al. | 717/174 |
| 6,615,408 B1 | | 9/2003 | Kaiser et al. | |
| 6,668,378 B2 | * | 12/2003 | Leak et al. | 725/136 |
| 6,732,370 B1 | * | 5/2004 | Gordon et al. | 725/39 |
| 6,938,270 B2 | * | 8/2005 | Blackketter et al. | 725/112 |
| 6,993,782 B1 | * | 1/2006 | Newberry et al. | 725/39 |
| 7,003,792 B1 | * | 2/2006 | Yuen | 725/46 |
| 7,028,327 B1 | * | 4/2006 | Dougherty et al. | 725/93 |
| 7,065,709 B2 | * | 6/2006 | Ellis et al. | 715/719 |
| 7,162,697 B2 | * | 1/2007 | Markel | 715/717 |
| 7,260,147 B2 | * | 8/2007 | Gordon et al. | 375/240.13 |
| 7,260,829 B1 | * | 8/2007 | Hendricks et al. | 725/152 |
| 7,269,842 B1 | * | 9/2007 | Estipona | 725/134 |
| 7,305,693 B2 | * | 12/2007 | Blackketter et al. | 725/61 |
| 7,367,042 B1 | * | 4/2008 | Dakss et al. | 725/60 |
| 7,634,787 B1 | * | 12/2009 | Gebhardt et al. | 725/36 |
| 2001/0023436 A1 | * | 9/2001 | Srinivasan et al. | 709/219 |
| 2002/0056129 A1 | * | 5/2002 | Blackketter et al. | 725/112 |
| 2002/0059644 A1 | * | 5/2002 | Andrade et al. | 725/136 |
| 2002/0129058 A1 | * | 9/2002 | Story et al. | 707/513 |
| 2003/0126621 A1 | * | 7/2003 | Leak et al. | 725/135 |
| 2004/0003400 A1 | | 1/2004 | Carney et al. | |
| 2004/0226051 A1 | | 11/2004 | Carney et al. | |
| 2005/0005303 A1 | * | 1/2005 | Barone et al. | 725/110 |
| 2005/0028201 A1 | * | 2/2005 | Klosterman et al. | 725/42 |
| 2006/0136965 A1 | * | 6/2006 | Ellis et al. | 725/46 |

FOREIGN PATENT DOCUMENTS

WO     WO 01/65832 A     9/2001

OTHER PUBLICATIONS

Dakss et al., "Hyperlinked Video", pp. 2-10, Proceedings of the SPIE Conference on Multimedia Systems and Applications, Nov. 1998, Boston.

* cited by examiner

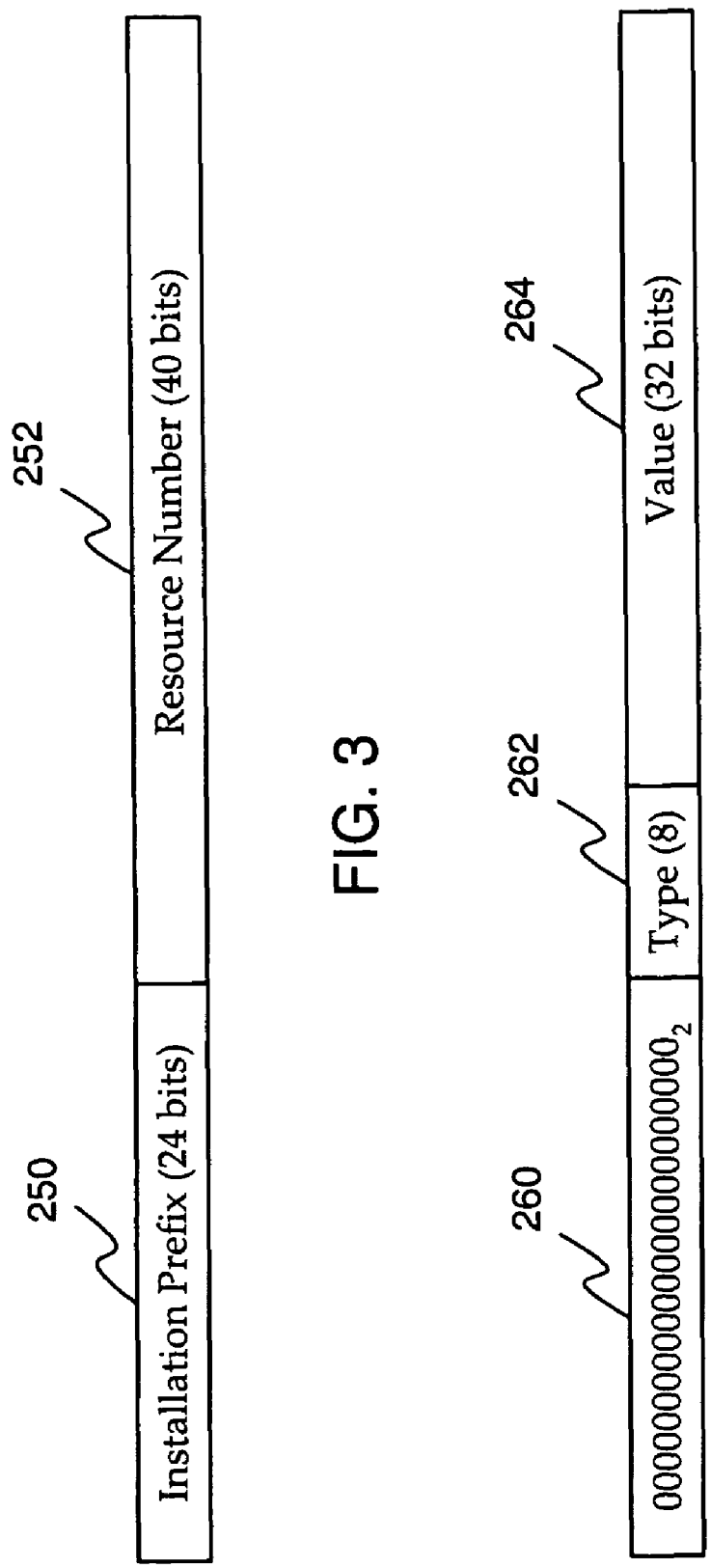

```
<VariableMapResource version="0" uid="0006000000158CF0" name="Sponsor Question" count="11">
<DictItem variable="13" uidref="0000000900000000" varName="bool_isCorrect" />
<DictItem variable="9" uidref="0000000900000001" varName="bool_TRUE" />
<DictItem variable="12" uidref="0006000000156A3C" varName="str_WrongMsg" />
<DictItem variable="8" uidref="0000000500000000" varName="int_PointTick" />
<DictItem variable="11" uidref="0006000000156A2D" varName="str_TimeUpMsg" />
<DictItem variable="7" uidref="0000000500000000" varName="int_PossiblePoints" />
<DictItem variable="10" uidref="0000000900000000" varName="bool_hasAnswer" />
<DictItem variable="6" uidref="000600000015580E" varName="str_CorrectAnswer" />
<DictItem variable="19" uidref="0006000000156D09" varName="str_NULL" />
<DictItem variable="f" uidref="0000000500000000" varName="int_AnswerLength" />
<DictItem variable="5" uidref="0000000500000000" varName="int_TimerLeft" />
</VariableMapResource>
```

FIG. 6

```
<OPTResource version="0" uid="D0090000001B7003" name="DHP Question OPT" count="9">
  <DictItem symbol="Color Palette Mode" uidref="0000000500000000" />
  <DictItem gensym="1000067" uidref="D0090000001BF0B7" />
  <DictItem gensym="1000066" uidref="D0090000001BF0B6" />
  <DictItem gensym="1000079" uidref="D0090000001D98DE" />
  <DictItem symbol="Interaction First Container" uidref="D0090000000176EDF" />
  <DictItem symbol="Item Params And Variables" uidref="D0090000001BE6F7" />
  <DictItem symbol="Content Item ID" uidref="00000005FFFFFF88" />
  <DictItem symbol="PopUp Callback Data Type" uidref="0000000500000000" />
  <DictItem symbol="PopUp Callback Action List" uidref="0006000000161FDE" />
</OPTResource>
```

FIG. 7

```
                368  360  370  374   361 376 362          372             364                                  366
                 ~    ~    ~    ~     ~   ~   ~            ~               ~                                    ~
                <ContainerWidgetResource version="0" uid="D0090000019F10B" name="LAYOUT 1" count="12">
                  <DictItem symbol="Vertical Contents Alignment" uidref="000000050000000000" />
                  <DictItem symbol="Promote Own Attributes" uidref="D0090000019F110" />
                  <DictItem symbol="Field List" uidref="D0090000019F114" />
                                                          374       376
                  <DictItem symbol="Navigation List" uidref="D0090000019F115" />
                  <DictItem symbol="Inactive Background Color" uidref="00000000200FFFFFF" />
                                                                    378
                  <DictItem symbol="Number Of Columns" uidref="000000050000000001" />
                                                      380
                  <DictItem symbol="Number Of Rows" uidref="000000050000000002" />
                                                    382
                  <DictItem symbol="Default Focus" uidref="000000050000000000" />
                  <DictItem symbol="Scroll Behavior" uidref="000000050000000002" />
                  <DictItem symbol="Border Width" uidref="000000050000000004" />
                  <DictItem symbol="Navigation Type" uidref="000000050000000001" />
                  <DictItem symbol="Wrap Behavior" uidref="000000050000000000" />
                  <DictItem symbol="Background Image" uidref="000401000008A4B0"/>
                  <DictItem symbol="Horizontal Contents Alignment" uidref="000000050000000000" />
                </ContainerWidgetResource>
```

FIG. 8

```xml
<ContainerWidgetResource version="0" uid="D00900000176EDF" name="LAYOUT 1" count="12">
  <DictItem symbol="Vertical Contents Alignment" uidref="00000005000000000" />
  <DictItem symbol="Promote Own Attributes" uidref="D00900000176EE4" />                    452
  <DictItem symbol="Field List" uidref="D00900000176EE8" />
  <DictItem symbol="Navigation List" uidref="D00900000176EE9" />
  <DictItem symbol="Inactive Background Color" uidref="00000002000FFFFFF" />
  <DictItem symbol="Number Of Columns" uidref="00000005000000001" />
  <DictItem symbol="Default Focus" uidref="00000005000000000" />
  <DictItem symbol="Scroll Behavior" uidref="00000005000000002" />
  <DictItem symbol="Border Width" uidref="00000005000000004" />
  <DictItem symbol="Navigation Type" uidref="00000005000000001" />
  <DictItem symbol="Wrap Behavior" uidref="00000005000000000" />
  <DictItem symbol="Horizontal Contents Alignment" uidref="00000005000000000" />
</ContainerWidgetResource>

<FieldListResource version="0" uid="D00900000176EE8" name="ValueValueResource" count="2">
  <UIDReferencePair uidref1="D00900000176EEA" uidref2="D00900000176EEF" />                 456
  <UIDReferencePair uidref1="D0090000017369" uidref2="D0090000017736E" />                  458
</FieldListResource>

<ContextualAttributesResource version="0" uid="D00900000176EEF" name="Child 1 Contextual Attributes" count="8">
  <DictItem symbol="Pass Events Up" uidref="00000005FFFFFFFF" />
  <DictItem symbol="Height" uidref="000000063F800000" value="1.000000" />
  <DictItem symbol="X Position" uidref="00000006000000000" value="0.000000" />
  <DictItem symbol="Participate In Grid" uidref="00000005FFFFFFFF" />
  <DictItem symbol="Initial Visibility" uidref="00000005000000001" />
  <DictItem symbol="Width" uidref="000000063F800000" value="1.000000" />
  <DictItem symbol="Z Order" uidref="00000005000000000" />
  <DictItem symbol="Y Position" uidref="00000006000000000" value="0.000000" />
</ContextualAttributesResource>
```

```
<EventTableResource version="0" uid="D0090000000177252" name="4 events enabled" count="4">
                                  500              502
<DictItem event="RC DIGIT4" uidref="D009000000017725E" />
<DictItem event="RC DIGIT3" uidref="D0090000000177260" />
<DictItem event="RC DIGIT2" uidref="D009000000017725C" />
<DictItem event="RC DIGIT1" uidref="D009000000017725A" />
</EventTableResource>
```

FIG. 12

```
<ActionListResource version="0" uid="D0090000001B0918" name="To Conditional" count="7">
                                                                            510
    <UIDReference uidaction="Assign" />
                              512
    <UIDReference uidsymbol="Inactive Foreground Color" />
                                     514
    <UIDReference uidref="0006000000156EE6" />
                             516
    <UIDReference uidsymbol="Inactive Foreground Color" />
                                     518
    <UIDReference uidref="00060000001571FA" />
                             520
    <UIDReference uidaction="GoTo" />
                              522
    <UIDReference uidref="D0090000001B08EF" />

</ActionListResource>
```

FIG. 13

```xml
<BackEndServiceResource version="0" uid="0006000000000A8BB7" name="Poll Response" count="2">
  <DictItem symbol="Return Type" uidref="0006000000000A8BB8" />
  <DictItem symbol="Argument List" uidref="0006000000000A8BB9" />
</BackEndServiceResource>

<StringResource version="0" uid="0006000000000A8BB8" name=""><![CDATA[]]></StringResource>
<ArgumentListResource version="0" uid="0006000000000A8BB9" name="New Vector" count="2">
  <UIDReference uidref="0000000050000000" />
  <UIDReference uidref="0000000050000000" />
</ArgumentListResource>
```

FIG. 14

```
<ContainerWidgetResource version="0" uid="00040100000087EE4" name="background" count="10">
  <DictItem symbol="Vertical Contents Alignment" uidref="00000005000000000"/>
  <DictItem symbol="Field List" uidref="00040100000087EE7"/>
                                              └─654
  <DictItem symbol="Navigation List" uidref="00040100000087EE8"/>
              652
  <DictItem symbol="Default Focus" uidref="00000005000000000"/>
  <DictItem symbol="Number Of Columns" uidref="00000005000000001"/>
  <DictItem symbol="Scroll Behavior" uidref="00000005000000002"/>
  <DictItem symbol="Border Width" uidref="00000005000000004"/>
  <DictItem symbol="Navigation Type" uidref="00000005000000001"/>
  <DictItem symbol="Wrap Behavior" uidref="00000005000000000"/>
  <DictItem symbol="Horizontal Contents Alignment" uidref="00000005000000000"/>
</ContainerWidgetResource>

<NavigationOrderResource version="0" uid="00040100000087EE8" name="New Vector" count="4">
  <UIDReference uidref="00040100000087EE9"/>
  <UIDReference uidref="00040100000087EEC"/>  ⎫
  <UIDReference uidref="00040100000087EEF"/>  ⎬ 658
  <UIDReference uidref="000401000000088136"/> ⎭
</NavigationOrderResource>
```
650 ... 656

FIG. 15

```
<FieldListResource version="2.0" uid="0004010000087EE7" name="ValueValueResource" count="4">
                                                  /~700                                    /~702
<UIDReferencePair uidref1="0004010000087EE9" uidref2="0004010000087EEB"/>
<UIDReferencePair uidref1="0004010000087EEC" uidref2="0004010000087EEE"/>
<UIDReferencePair uidref1="0004010000087EEF" uidref2="0004010000087EF1"/>
<UIDReferencePair uidref1="0004010000088136" uidref2="0004010000088138"/>
</FieldListResource>
```

FIG. 16

SYSTEM AND METHOD FOR DESCRIBING PRESENTATION AND BEHAVIOR INFORMATION IN AN ITV APPLICATION

CROSS-REFERENCE TO RELATED APPLICATION(S)

This application claims the benefit of U.S. Provisional Application No. 60/548,997, filed on Mar. 1, 2004, and U.S. Provisional Application No. 60/634,757, filed on Dec. 9, 2004, and is a continuation-in-part of U.S. application Ser. No. 09/694,079, filed on Oct. 20, 2000 now U.S. Pat. No. 7,367,042, the content of all which are incorporated herein by reference.

FIELD OF THE INVENTION

This invention relates generally to interactive television systems, and more particularly, to an application definition language describing presentation and behavior information in an interactive television application.

BACKGROUND OF THE INVENTION

Interactive television (ITV) combines conventional television with additional content, referred to as ITV content, to present a viewer with an enhanced version of an audiovisual program, such as a broadcast television program, commercial, or VOD content. As used herein, the term ITV content refers to any additional information or application that is invoked to create one of the aforementioned enhanced television experiences.

In order to generate an enhanced television experience, information on how the enhanced content is to be displayed, as well as how the enhanced content is to behave in response to user actions or other external events, are provided to an executing client. Generally speaking, the presentation and behavior information should be as rich and descriptive as possible to provide a viewer with a superior enhanced television experience. However, due to limited bandwidth and platform resources of the receiving client, the presentation information should also be small and efficient.

Accordingly, what is desired is a system and method for an optimized interactive application definition language that describes ITV presentation and behavior information in a manner that relieves the tension between these two competing requirements for generating an ITV experience.

SUMMARY OF THE INVENTION

According to one embodiment, the present invention is directed to an application definition language used to generate ITV applications for different types of target platforms and devices in an interactive television system.

According to one embodiment, the interactive television system includes an authoring tool and an execution engine. The authoring tool generates an ITV application including presentation information represented via a plurality of data structures built based on one or more predetermined data structure types. Each data structure may be referenced by a unique identifier that is associated with a memory location for the data structure. The execution engine receives and executes the ITV application and provides an associated interactive event.

According to one embodiment, the ITV application includes behavior information describing how the application behaves in response to an external event. The behavior information is stored in a data structure separate from the data structure storing the presentation information.

According to one embodiment, the execution engine stores a plurality of default values for the presentation information and retrieves the default values in response to an absence of corresponding values in the plurality of data structures.

According to one embodiment, an interchange formatting system generates a compact representation of the ITV application prior to delivery to the execution engine. The compact representation may be a binary representation.

According to one embodiment, a first of the plurality of data structures inherits properties associated with a second of the plurality of data structures.

According to one embodiment, the plurality of data structures are packaged into a module having header information. The module may be catered to a particular platform and/or profile of a receiving client. The execution engine may examine the header information for determining a relevance of the module to the execution engine.

According to another embodiment, the present invention is directed to an authoring tool generating an ITV application. The authoring tool includes a data store storing and organizing a first portion of interactive content presentation or behavior information in a first data structure generated based on one or more base data structure types. The first data structure includes a symbol mapped to a unique identifier value that references a second data structure. The data store also stores and organizes a second portion of interactive content presentation or behavior information in the second data structure.

According to one embodiment, the second data structure inherits properties defined by the first data structure. Such properties may include visual presentation properties.

According to one embodiment, the first data structure stores and organizes the presentation information, and the second data structure stores and organizes the behavior information.

According to yet another embodiment, the present invention is directed to a client device in an interactive television system. The client device includes a decoder receiving an ITV application including presentation and behavior information represented via a plurality of data structures. Each data structure is identified by an identifier. The ITV application further includes one or more ITV commands.

The client device also includes a processor coupled to the decoder, and a memory coupled to the processor. The memory includes computer program instructions executable by the processor stored therein. The computer program instructions include parsing each data structure included in the received ITV application and retrieving the identifier associated with the parsed data structure; identifying a memory location based on a retrieved identifier; storing an associated data structure in the identified memory location; retrieving an ITV command included in the received ITV application, the command including a command name and an identifier of a particular data structure associated with the command; retrieving the particular data structure from a particular memory location based on the identifier included in the ITV command; and executing the ITV command with respect to the retrieved data structure.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIG. 3 is layout diagram of a resource UID according to one embodiment of the invention;

FIG. 4 is a layout diagram of a non-resource UID containing a scalar value according to one embodiment of the invention;

FIG. 6 illustrates an exemplary variable map resource XML document according to one embodiment of the invention;

FIG. 7 illustrates an exemplary object properties table resource XML document according to one embodiment of the invention;

FIG. 8 illustrates an exemplary container widget resource XML document according to one embodiment of the invention;

FIG. 11 illustrates an exemplary XML document for a container widget resource, field list resource, and contextual attributes resource according to one embodiment of the invention;

FIG. 12 illustrates an exemplary event table resource XML document according to one embodiment of the invention;

FIG. 13 illustrates an exemplary action list resource XML document according to one embodiment of the invention;

FIG. 14 illustrates an exemplary XML document for a back end service resource and an argument list resource according to one embodiment of the invention;

FIG. 15 illustrates an exemplary XML document for a container widget resource and navigation order resource according to one embodiment of the invention; and FIG. 16 illustrates an exemplary field list resource XML document according to one embodiment of the invention.

DETAILED DESCRIPTION

In general terms, the various embodiments of the present invention are directed to an ITV application definition language (ADL) used to generate ITV applications for different types of target platforms and devices. The ITV applications are associated with, but not limited to, enhanced television, virtual channels, managed content, games, interactive program guides, and interactive advertising content.

According to one embodiment, the ADL provides a plurality of core data structure types upon which one or more data structures, also referred to as constructs, may be built. These constructs describe and organize ITV content presentation information, such as, for example, font size and color, as well as the logic, or behavior, of the ITV application providing the content. The behavior information describes how the application responds to an end user's action or another external event.

According to one embodiment, data structures storing ITV content presentation and behavior information are referred to as resources. A resource is associated with a globally unique identifier that allows the data structure to be efficiently stored and retrieved from a hash table. A resource is also associated with an expiration time stamp that indicates when the resource is to be freed from memory. A resource is of arbitrary length, and contains values that differ from the default values stored at a receiving client device. Resources are also packaged into a module that may be catered to a platform and/or profile of a receiving client. The client may quickly determine whether the module is relevant to it by examining the platform and/or profile ID contained in a header of the module.

The core data structure types provided by the ADL include but are not limited to: (1) dictionaries; (2) unique identifier (UID) vectors; (3) UID pair vectors; (4) images; (5) strings; and (6) fonts. By restricting the number of data structure types to a limited number, and by creating these structures to be highly flexible and reusable, different types of ITV applications may be generated without requiring change to the way the ITV application is parsed, encoded, or distributed.

Figure 1A:
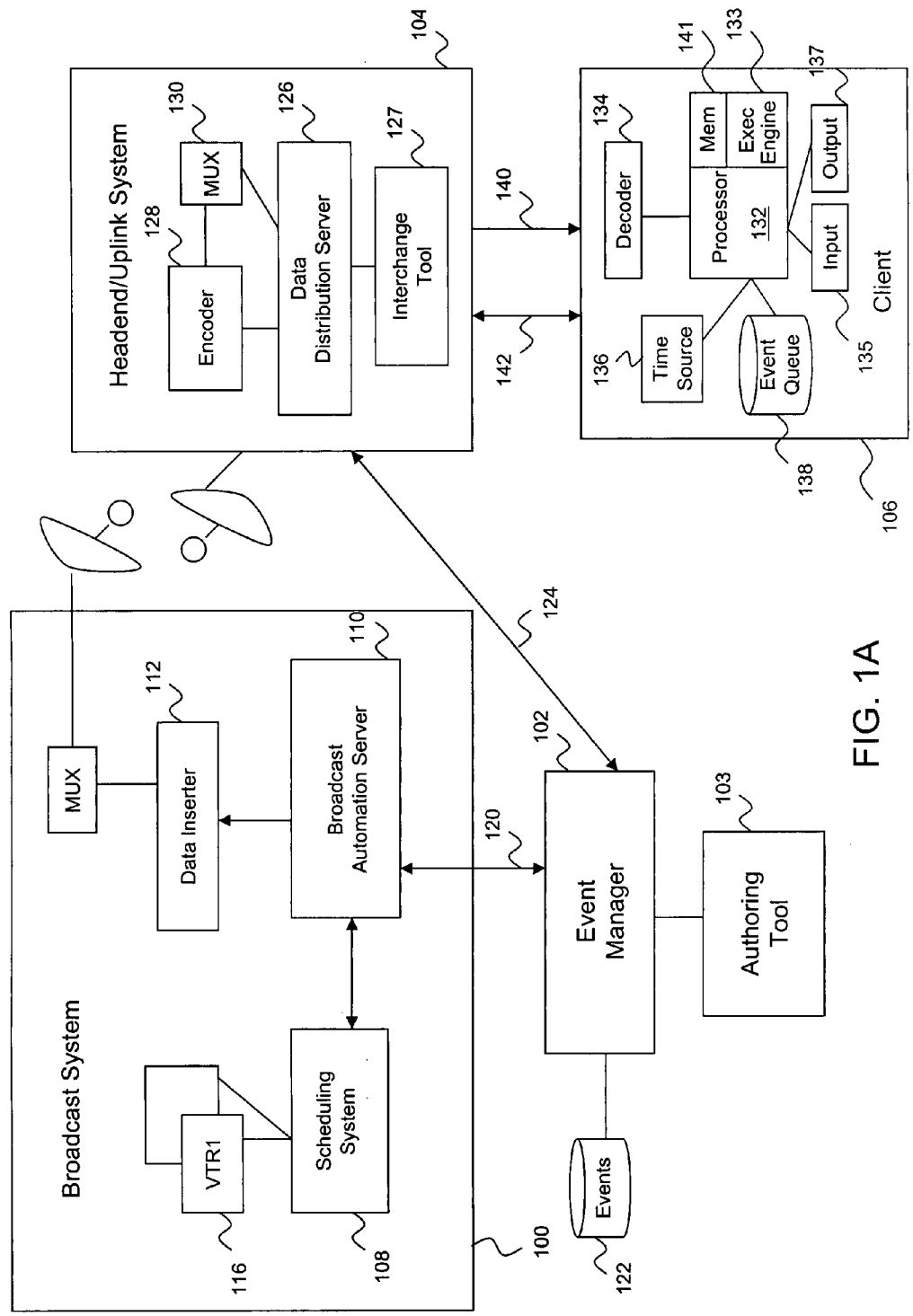
FIG. 1A is a block diagram of an ITV system that employs an application definition language to describe ITV presentation and behavior information according to one embodiment of the invention.

FIG. 1A is a block diagram of an ITV system that employs the ADL to describe ITV presentation and behavior information according to one embodiment of the invention. The ITV system includes a broadcast system 100, event manager 102, headend system 104, and one or more clients 106. The broadcast system 100, which may be located at a broadcast operating center, includes a scheduling system 108, broadcast automation server 110, data inserter 112, and one or more video players 116 (e.g. VTRs). Other equipment typical in a broadcast operating center may also be included in the broadcast system 100, such as, for example, a character generator (not shown) for overlaying text and images on top of an audiovisual content element.

The scheduling system 108 generates a television programming playlist including a schedule of the programs to be transmitted on a given day. The playlist includes, for example, a list of timecodes along with their program segment identifiers, program segment sources, and/or program segment durations. The playlist is then used by the scheduling system 108 to drive the video players 116 containing the actual video and audio of the content elements that are to be delivered.

The broadcast automation server 110 monitors the generated playlist and detects any changes that may be made to the playlist. According to one embodiment of the invention, the broadcast automation server 110 reads ahead in the generated playlist by, for example, a couple of hours, and transmits up-to-date entries of the playlist to the event manager 102 over a wired or wireless data communications link 120. The data communications link 120 may be for example, a secure Internet link, local area network link, wide area network link, or the like.

The event manager 102 receives playlist information from different broadcast systems and retrieves appropriate ITV event information in response. According to one embodiment of the invention, the ITV event information for the different broadcast systems is centrally maintained in an ITV events database 122. In this regard, the ITV events database 122 stores for each broadcast station, a mapping of ITV events to specific segment (or show) identifiers. The ITV events database 122 further stores for each mapped ITV event, the ITV content presentation and behavior information for running the ITV event.

According to one embodiment of the invention, the event manager 102 is coupled to an authoring tool 103 which generates the ITV applications associated with the ITV events using the ADL. The presentation and behavior information in the ITV applications are expressed in an Extensible Markup Language (XML) format, or in any other data expression format known in the art. Once generated, the ITV applications are stored in the ITV events database 122.

According to one embodiment of the invention, the ITV event manager 102 detects, among the received playlist information, a program segment that is associated with an ITV event, and prepares to playout data related to the ITV event. The playout data includes, for example, the ITV application with the actual logic and presentation information for generating the ITV event.

A content element, such as, for example, a television program, commercial, or VOD content, is transmitted to various recipients, including the headend system 104 of a local cable operator or some other uplink system. According to one embodiment of the invention, the headend system 104 includes a data distribution server 126 coupled to an encoder 128 and multiplexer 128, all of which are used to deliver the received content element and any associated ITV applications to the client 106.

According to one embodiment, the headend (or uplink) system 104 includes a copy of all or a portion of the playlist generated by the scheduling system 108. The portion of the playlist may be communicated by the event manager 102 over a wired or wireless data communications link 124 such as, for example, a secure Internet link, local area network link, or wide area network link.

Based on its playlist and information provided by the event manager 102, such as, for example, information on the audio-visual content elements for which ITV applications are available, such as a program segment, the data distribution server 126 transmits to the event manager 102 one or more requests for associated ITV applications prior to the scheduled play time of the identified audiovisual content elements. The request is transmitted over the secure data communications link 124.

In response to the request from the data distribution server 126, the event manager 102 transmits to the headend system 104 one or more ITV applications containing all the needed presentation and behavior data that the client will need to run an ITV event. The data distribution server 126 then delivers to the client the received ITV applications at appropriate times which are calculated based on the scheduled ITV event times.

According to one embodiment of the invention, an ITV application is sent to the client in a sequence of profile and/or platform specific modules. The modules contain a stream of objects that are referenced within the ITV application. An object may either include the presentation and logic data, or a command invoking the presentation/logic data at an appropriate time.

In generating the objects for delivery to the client 106, the presentation and logic data and associated commands contained in the ITV application are first parsed by an interchange formatting system 133 coupled to the data distribution server 126. The parsed data is then transformed into a compact, semantically equivalent representation of the data. According to one embodiment of the invention, the compact representation is a binary representation.

The transformation is based on an interchange format to which the interchange formatting system 133 adheres. The interchange format makes it possible to use significantly less bandwidth to deliver the presentation and logic data to a target platform, and to occupy significantly less memory, while not making it any more complicated to parse by an execution engine residing at the client 106.

According to one embodiment of the invention, the sequence of modules that include the stream of objects with the compact presentation and behavior information are packetized and multiplexed into an MPEG-2 transport stream and streamed to the client 106 in-band with the content element. The modules may also be encoded into the vertical or horizontal blanking interval of an analog video signal or into an ancillary data space of a digital video stream. Furthermore, the modules may be delivered out-of-band over an Internet connection, or via a separate channel such as, for example, a QPSK-modulated or DOCSIS channel.

According to one embodiment of the invention, instead of transmitting the modules to the headend system for delivering to the client, the event manager 102 transmits the data to the broadcast automation server 110 for embedding into the content element. In this scenario, the broadcast automation server 110 invokes a data inserter 112 for inserting the modules into the content element. Thus, the content element received by the headend system 104 already includes the appropriate presentation and logic information and associated commands needed by the client for running an ITV event.

According to one embodiment of the invention, the client 106 is any ITV reception device known in the art, such as, for example, an analog or digital cable, terrestrial, or satellite set-top box or consumer electronics device. The client 106 includes a processor 132 hosting an execution engine 133 and coupled to a decoder 134. The client is further coupled to an input device 135, such as a remote controller, wireless keyboard, voice input device, and the like, for receiving input data from a viewer. The client is also coupled to an output device 137, such as a display, a speaker, and the like, to provide output data to the viewer.

The execution engine 133, together with the decoder, retrieve and process the modules embedded into a content element received over a transmission channel 140. The execution engine may further retrieve and process modules transmitted over an out-of-band data path 142.

If a module relevant to the execution engine 133 is identified, the execution engine parses the objects containing the presentation/logic and command information represented in a binary or some other compact format. The parsed ITV commands are stored in an event queue 138 and invoked at their appropriate execution times as indicated by a time source 136.

The parsed presentation and logic information are stored in a local memory 141 and presented when their respective ITV commands are invoked. According to on embodiment of the invention, the execution engine 133 stores the parsed presentation and logic information in a hash table based on unique identifies (UIDs) assigned to the constructs that include the presentation and logic information. This allows the stored data to be referenced with a single level of indirection, preserving CPU cycles during the execution of an application.

According to one embodiment of the invention, the constructs containing the presentation and logic information include an expiration timestamp. The execution engine 133 uses the expiration timestamp to free the memory location storing the construct once it is determined, based on the time indicated by the time source 136, that the time indicated by the expiration timestamp has arrived. This allows the execution engine 133 to make room for new objects that are delivered to the client.

According to one embodiment of the invention, the client's local memory 140 stores default values for all or a portion of presentation and behavior attributes described by the ADL. If the execution engine 133 does not receive a (key, value) pair describing a particular attribute, it assumes that the default value should be used for that attribute. As a result, the constructs containing the presentation and logic information may be variable in length. Unlike fixed length constructs of the prior art that contain all of the construct's attributes, variable length constructs that only define attributes whose values are different from the values maintained by the client are more efficient in terms of memory usage.

Figure 1B:
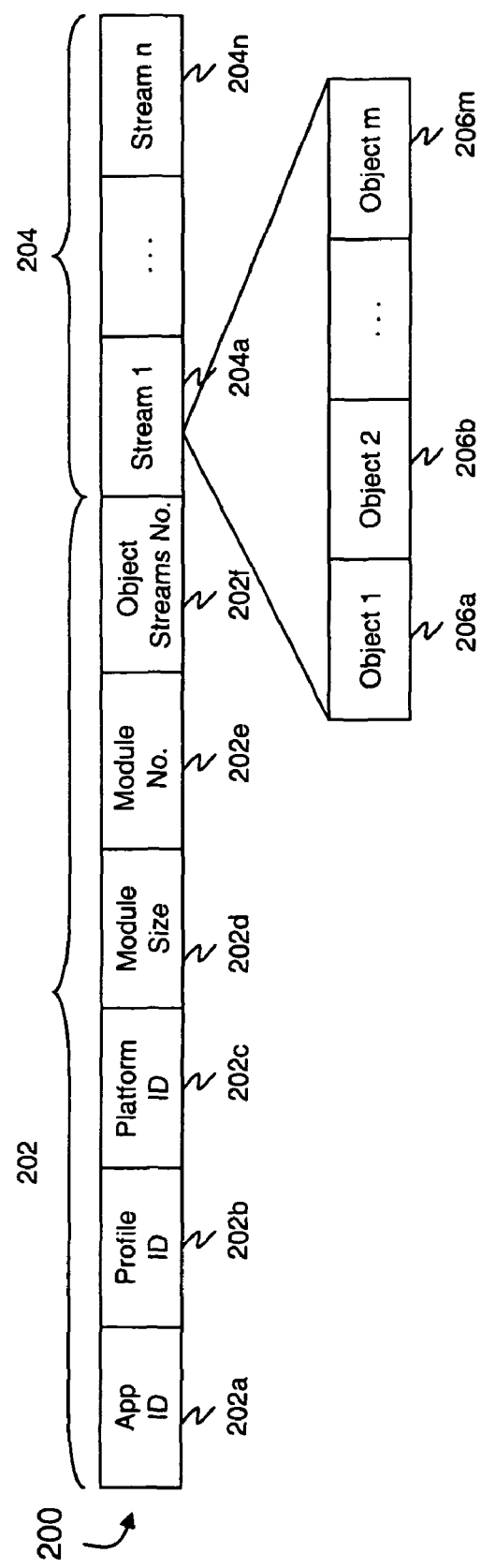
FIG. 1B is a block diagram of a module generated by a data distribution server in the ITV system of FIG. 1A according to one embodiment of the invention.

FIG. 1B is a block diagram of a module 200 generated by the data distribution server 126 according to one embodiment of the invention. The module includes a header portion 202 and payload portion 204. The header portion 202 includes header information, such as, for example, an application ID 202a, profile ID 202b, and platform ID 202c, which allows the receiving execution engine 133 to quickly determine whether the module is applicable to the engine or not. If the module is deemed to not be applicable, the execution engine ignores the next moduleSize 202d bytes until the start of the next module. By quickly evaluating the relevance of an incoming module and choosing to ignore it if it is not relevant, the execution engine may spend the smallest possible amount of CPU cycles evaluating modules that have no relevance to it.

If the module is deemed relevant, the engine proceeds to parse and decode a module number 202e, an object streams number 202f, and a payload portion 204 of the module. According to one embodiment, the payload portion includes one or more object streams 204a-204n where each object stream includes one or more objects 206a-206m used for running one or more ITV events. An object may contain a resource or a command. Resources are data structures describing and organizing the ITV presentation and behavior information. Commands are time-oriented ITV commands associated with the resources. According to one embodiment of the invention, the objects 206a-206m are represented in a compact format, such as, for example, a binary format.

Table 1 describes an interchange format adhered by the interchange formatting system 127 for translating a module into a compressed representation according to one embodiment of the invention.

TABLE 1

Module Layout Table

| Syntax | Number of bits | Format |
|---|---|---|
| ModuleLayoutTable( ) { | | |
| applicationID | 32 | uimsbf |
| profileID | 8 | uimsbf |
| platformID | 8 | uimsbf |
| moduleSize | 8 | uimsbf |
| moduleNumber | 8 | uimsbf |
| numberOfObjectStreams | 8 | uimsbf |
| Private Use | 8 | uimsbf |
| Reserved for future standardization | 8 | uimsbf |
| Reserved for future standardization | 8 | uimsbf |
| for (i = 0; i < (numberOfObjectStreams; i++) { | | |
| streamID | 8 | uimsbf |
| } | | |

TABLE 1-continued

Module Layout Table

| Syntax | Number of bits | Format |
|---|---|---|
| for (i = 0; i < (0 − numberOfStreams)%4; i++) { | | |
| padTo4ByteAlignment | 8 | uimsbf |
| } | | |
| for (i = 0; i < numberOfObjectStreams; i++) { | | |
| numberOtBytes | 32 | uimsbf |
| firstObjectStartsAt | 32 | uimsbf |
| } | | |
| } | | | applicationID: a 32-bit value identifying the application.
profileID: an 8-bit value identifying the profile of the objects described in the module. The value may indicate a common, baseline, low, full, or advanced profile.
platformID: an 8-bit value identifying the platform of the objects described in the module. A particular platform ID may identify, for example, a Motorola set-top-box as opposed to a Scientific Atlanta set-top-box.
moduleSize: an 8-bit value indicating a number of kilobytes in the module, including the ModuleLayoutTable.
moduleNumber: an 8-bit value indicating an identifier for the module based on the profileID. The module number may serve as a continuity counter.
numberOfObjectStreams: an 8-bit value indicating a number of parallel objects streams contained in the module.
streamID: an 8-bit value identifying a particular type of stream contained in the module. The stream ID may indicate a trailer object data, mask data, small objects, large objects, dynamic data, and the like.
numberOfBytes: a 32-bit value indicating a number of bytes in an object stream.
firstObjectStartsAt: a 32-bit offset, from the beginning of the object stream, of the beginning of the first object in an object stream.

As discussed, an object stream contained in a module is sequence of commands and resources. Table 2 describes an interchange format adhered by the interchange formatting system 127 for generating an object header preceding a command or resource according to one embodiment of the invention.

TABLE 2

Object Header

| Syntax | Number of bits | Format |
|---|---|---|
| ObjectHeader( ) { | | |
| ebiMagic | 8 | uimsbf |
| objectLength | 24 | uimsbf |
| } | | | ebiMagic: an 8-bit constant set to 0x77.
objectLength: a 24-bit value indicating the length, in bytes, of the command or resource object (not including the object header).

Figure 2A:
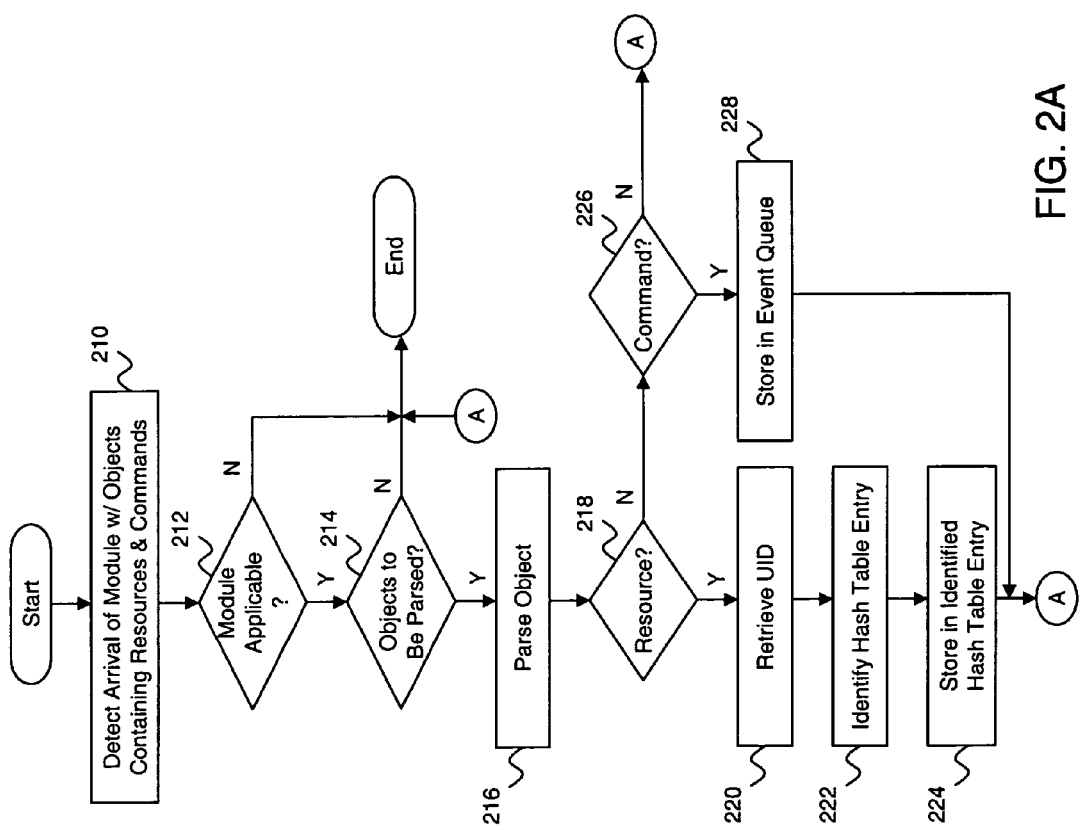
FIG. 2A is a process flow diagram executed by an execution engine for receiving and processing modules according to one embodiment of the invention.

FIG. 2A is a process flow diagram executed by the execution engine 133 based on computer program instructions stored in the memory 140 for receiving and processing modules according to one embodiment of the invention. In step 210, the execution engine 133 detects arrival of a module with objects containing resources and commands. In step 212, a determination is made as to whether the module is applicable to the execution engine 133. This may be done, for example, by examining the application ID 202a, profile ID 202b, and/or platform ID 202c included in the header portion 202 of the module, and comparing it against the execution engine's own application ID, profile ID and/or platform ID stored in the memory 140, for a match.

If the module is deemed to be applicable, the execution engine proceeds to parse the objects included in the module. In this regard, in step 214, a determination is made as to whether there are objects in the module that still need to be parsed. If the answer is YES, the engine proceeds to parse a current object in step 216. According to one embodiment of the invention, the object that is parsed contains a compressed representation of one or more data structures that store the resource or command information.

In step 218, a determination is made as to whether the object contains a resource data structure. If the answer is YES, the execution engine retrieves the resource's UID in step 220. In step 222, a hash table entry is identified based on the retrieved UID. In step 224, the resource is stored in the identified hash table entry.

If the object does not contain a resource data structure, a determination is made in step 226 as to whether the object contains a command data structure. If the answer is YES, the command is stored in the event queue 138 according to, for example, a start timecode associated with the command.

Figure 2B:
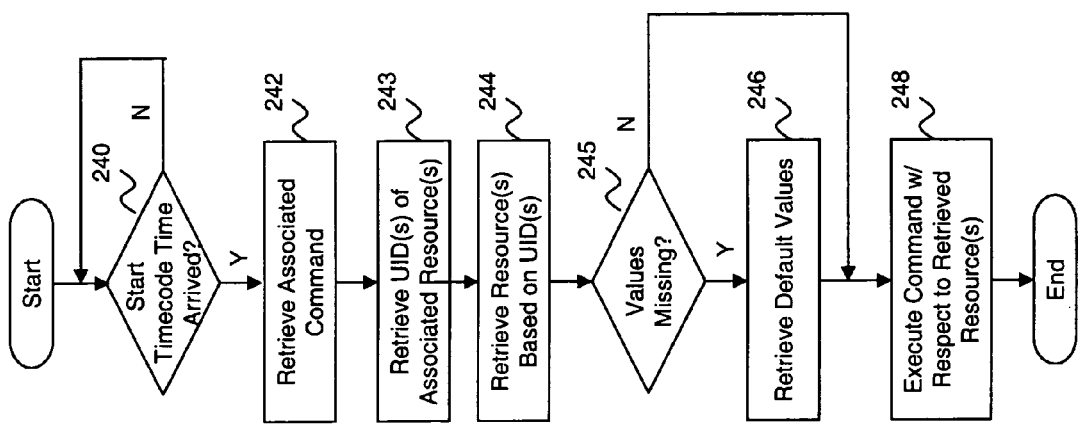
FIG. 2B is a process flow diagram executed by an execution engine for executing ITV commands according to one embodiment of the invention.

FIG. 2B is a process flow diagram executed by the execution engine 133 based on computer program instructions stored in the memory 140 for executing ITV commands according to one embodiment of the invention.

In step 240, the execution engine determines whether a start timecode time for a command stored in the event queue 138 has arrived. This may be done, for example, by examining the time source 136 for its time indication. In step 242, the command marked with the start timecode is retrieved from the event queue. According to one embodiment of the invention, the data structure storing the command information includes, in addition to the start timecode, a command name and one or more UIDs of resource data structures for which the command is to be executed.

In step 243, the execution engine retrieves the one or more UIDs included in the command, and in step 244, uses the UIDs to retrieve the associated resources. According to one embodiment of the invention, the one or more UIDs are used to compute one or more hash table entries storing the one or more resources.

In step 245, a determination is made as to whether any of the retrieved data structures have attributes with missing values. If the answer is YES, the execution engine retrieves, in step 246, default values stored in the memory 140 to be used for the attributes with the missing values.

In step 248, the command identified by the command name is executed with respect to the retrieved resource(s). For example, the command may be a command to display a widget according to the presentation and behavior information included in the retrieved resource data structure.

A. UIDs

According to one embodiment of the invention, the ADL treats each resource describing and organizing the presentation and behavior information independently, and provides to each resource a memory location in the form of a UID, allowing the resource to be stored and unambiguously referenced. According to one embodiment of the invention, each resource is stored in a hash table based on its UID. In this manner, resources may be referenced with a single level of indirection, preserving CPU cycles during the execution of the ITV application.

UIDs also promote reuse of resources where one or more interactive applications can reference the same resource or value through its UID. In contrast, prior art mechanisms store data in tables with rows and columns, and a directory to locate the tables. This tabular row/column approach generally requires more operations to locate a resource or value, and makes it challenging to reuse resources throughout an application.

UIDs also enable an execution engine to be created whereby memory is managed dynamically to support the arrival of new data elements, including elements that were not necessarily expected to arrive when an application is authored (i.e. enhancements to a live event such as the Superbowl or Grammy Awards). An execution engine can receive new data elements and, through use of the data elements' UIDs, store the data elements in memory in locations that can be easily referenced. This offers advantages over other approaches where a memory partition is dictated in advance within the data stream itself, making it a challenge to support the arrival of new elements.

According to one embodiment of the invention, a UID may contain a scalar value or a memory location of a resource. UIDs containing scalar values are referred to as non-resource UIDs. UIDs referring to a specific instance of a resource are referred to as resource UIDs.

FIG. 3 is layout diagram of a resource UID according to one embodiment of the invention. The illustrated resource UID is a 64-bit value including 24-bit installation prefix 250 and a 40-bit resource value 252. A person of skill in the art should recognize, however, that the UID may be composed of less or more bits than the indicated 64-bits.

According to one embodiment, the installation prefix 250 uniquely identifies a source/creator of the resource. The source/creator uses its unique installation prefix in every resource UID it creates. This allows UIDs to be globally unique.

A globally unique UID has various advantages. First, it allows the monitoring of data prior to delivery to the execution engine to authenticate its source. Second, it allows a viewer's interaction to be tracked by delivering the UID from the execution engine to a reporting application (provided the reporting application can resolve the UID with the original content) resulting in a significantly reduced return-path data. Third, if a resource is stored based on a globally unique UID, a set of resources may be efficiently delivered to an execution engine through a variety of different data paths. Lastly, globally unique UIDs allow efficient storage of the resources in an object-oriented database.

FIG. 4 is a layout diagram of a non-resource UID containing a scalar value according to one embodiment of the invention. The illustrated non-resource UID is composed of a field 260 that corresponds to the installation prefix in the resource UID, a type field 262, and a value field 264. Field 260 that would correspond to the installation prefix contains zeros in a non-resource UID. The type field 262 identifies the data type of the contents of the value field 264. The various types of non-resource UIDs are provided in Table 3, along with their corresponding type IDs.

TABLE 3

| Scalar Types | |
|---|---|
| TypeID | Type |
| 1 | Action |
| 2 | Color |
| 3 | Private use |
| 4 | Symbol Name |
| 5 | Integer |
| 6 | Floating-Point Number |
| 7 | Event |
| 8 | Indexed Color |
| 9 | Bolean |
| 10 | Bit vector |
| 11-127 | Reserved for future standardization |
| 128-255 | Private use |

In addition to resource and non-resource UIDs, the ADL also defines a null UID which contains all zeros. A null UID simply indicates the absence of data.

B. Resources

The core data structure types/resources upon which all other data structures/resources are based include dictionaries, UID vectors, UID pair vectors, images, strings, and fonts. According to one embodiment of the invention, a particular resource generated based on one or more core resources have variable lengths, as opposed to fixed lengths. This is because a resource includes an attribute only if a value associated with the attribute differs from a default value maintained by the client.

According to one embodiment of the invention, the interchange formatting system 127 generates a resource header for all resources. Table 4 describes an interchange format adhered by the interchange formatting system 127 for generating the resource header according to one embodiment of the invention.

TABLE 4

Resource Header Binary Format

| Syntax | Number of bits | Format |
|---|---|---|
| ResourceHeader( ) { | | |
| commandType | 8 | uimsbf |
| headerVersionNumber | 4 | uimsbf |
| resourceVersionNumber | 4 | uimsbf |
| resourceType | 8 | uimsbf |
| reserved | 8 | uimsbf |
| resourceUID | 64 | uimsbf |
| expiration | 32 | uimsbf |
| } | | | commandType: an 8-bit value identifying a command. As such, the commandType is set to 0 for resource objects.
headerVersionNumber: a 4-bit version number for the resource header format. This value is incremented each time a backward-incompatible revision is made to a fundamental syntactic structure of the resource header format.
resourceVersionNumber: a 4-bit version number for the resource format. This value is incremented each time a backward-incompatible revision is made to a fundamental syntactic structure of the resource format.
resourceType: an 8-bit value identifying one of the six core resource types.
reserved: reserved for future standardization, and set to all '0' bits.
resourceUID: a 64-bit UID of the resource.
expirationTime: a 32-bit time reference at which the resource is no longer needed and may be freed from memory.

According to one embodiment of the invention, the stamping of each resource with an expiration time stamp allows the execution engine 133 to efficiently manage its memory 140 to make room for incoming resources. Given the highly dynamic nature of enhanced television, marking resources with such expiration timestamps enables the execution engine to free a resource from memory at the time indicated by the expiration timestamp, and make room for incoming resources, thereby enabling the interactive content of a program or commercial to change over time.

According to one embodiment, the bytes that follow the resource header are interpreted by the parsing execution engine 133 according to the identified resourceType. The start of the next object in the byte stream is aligned to the next 4 byte boundary after the end of the resource data.

1. Dictionary Resources

According to one embodiment, dictionary resources map symbols, also referred to as keys, to UID values. The UID values either reference other resources or contain a scalar value.

Figure 5:
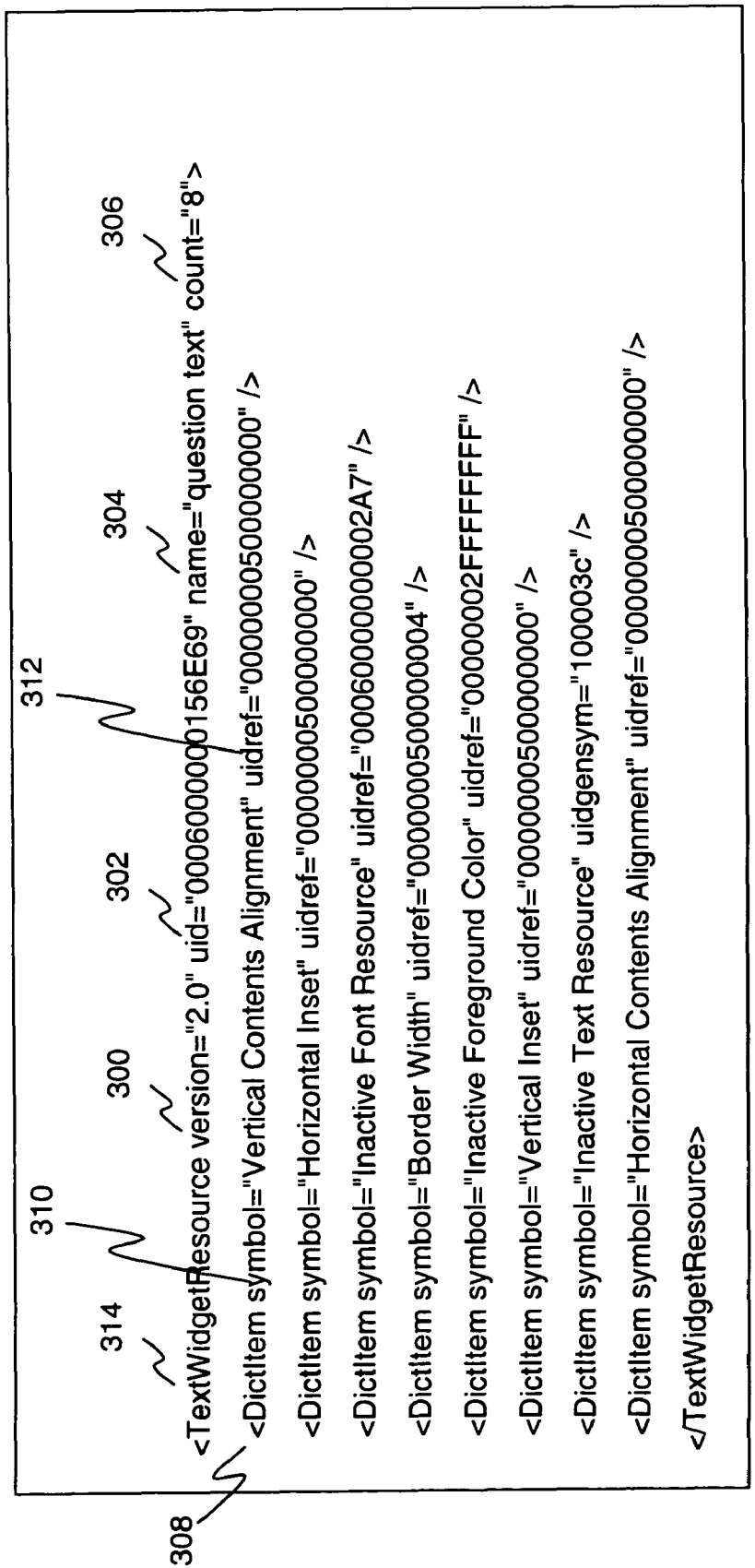
FIG. 5 illustrates an exemplary dictionary resource XML document according to one embodiment of the invention.

FIG. 5 illustrates an exemplary dictionary resource XML document according to one embodiment of the invention. The illustrated dictionary is a text widget dictionary resource as indicated by a resource name 314. The resource includes a version 300 of the ADL specification used to generate the resource, a resource UID 302 allocated to the resource, resource name 304, and a count 306 of the elements contained in the resource. A person of skill in the art should recognize that other attributes may also be used to describe the resource.

Dictionary resources include entries identified by a "DictItem" type 308 which map symbol names 310 to UID values 312.

Table 5 describes an interchange format adhered by the interchange formatting system 127 for translating a dictionary resource into a compressed representation according to one embodiment of the invention.

TABLE 5

Dictionary Resource Binary Format

| Syntax | Number of bits | Format |
|---|---|---|
| DictionaryResource( ) { | | |
| ResourceHeader( ) | | |
| dictionarySize | 32 | uimsbf |
| for (i = 0; i < dictionarySize; i++) { | | |
| symbol | 32 | uimsbf |
| } | | |
| for (i = 0; i < dictionarySize; i++) { | | |
| uid | 64 | uimsbf |
| } | | |
| } | | | dictionarySize: a 32-bit specifying a number of mappings in the dictionary.
symbol: a 32-bit value corresponding to a symbol name contained in the dictionary.
uid: a 64-bit UID of the associated symbol.

Table 6 provides a list of dictionary resources defined by the ADL, and a brief description of these resources.

TABLE 6

Dictionary Resources

| | |
|---|---|
| BackEndServiceResource | A dictionary that maps service properties to UIDs. |
| ContextualAttributesResource | A dictionary that maps contextual widget property names to UIDs. |
| ConnectionResource | Describes a return-path connection to a response server or interactive network |
| EventTableResource | A dictionary that maps event names to UIDs of ActionListResources. |
| OPTResource | A dictionary that is associated with an Item and maps symbol names to UIDs. |
| VariableMapResource | Maps all variable names that appear in an item to UIDs. |
| Widget | A dictionary that is associated with a widget and maps widget property names to UIDs. |
| ContainerWidgetResource | Represents a widget that holds other widgets. |
| ImageWidgetResource | Represents a widget that displays a graphic. |
| TextEntryWidgetResource | Represents a widget that collects textual input from the viewer. |
| TextWidgetResource | Represents a widget that displays text. |
| VideoWidgetResource | Represents a widget that controls the display of motion imagery. | a. Variable Map Dictionary Resource

A variable map resource maps variables used for a particular ITV interaction, to their initial UID values. FIG. 6 illustrates an exemplary variable map resource XML document according to one embodiment of the invention. For each entry, the illustrated resource document identifies a variable 350 used for the interaction, an initial UID value 352 of the variable, and an optional text name 354 of the variable for readability purposes (this is typically stripped out by the interchange formatting system). According to one embodiment of the invention, there is one variable map resource for each interaction.

b. OPT Dictionary Resource

An object property table (OPT) resource is a dictionary that maps symbol names associated with a production or interaction, to corresponding UIDs. A collection of interactions that are specific to a piece of media, such as, for example, a television episode, movie, or commercial, are contained in a production.

The OPT resource generally contains variables that change dynamically, such as, for example, a string with a new stock quote. If a value is updated, a change command may be sent to update the OPT values. The execution engine may see that the values have been updated and update them in the OPT resource accordingly.

As illustrated in FIG. 7, OPT elements are represented by listing a "gensym" (or generic symbol) reference to the variable 340 and a UID 342 that either contains the value for the variable or references a resource that corresponds to the variable. Properties associated with the resource are further represented by symbol/UID pairs.

c. Back End Service Dictionary Resource

A back end service resource defines the formal arguments (or signature) of a remote function which runs on a response server (not shown) coupled to the client 106. A first dictionary item in the resource defines the type of the value returned by the remote function, such as an integer, string, image or vector of elements. A second dictionary item is an argument list of values to be passed to the remote function where each UID in the list of arguments conveys both: (1) the type required by the corresponding actual argument when the remote function is actually invoked; and (2) a default value for use in constructing the actual argument list. According to one embodiment, the back end resource is invoked as part of an action list with the values of the arguments.

d. Connection Dictionary Resource

Connection resources are an unordered list of symbols representing return-path parameters, each of which map to an UID value or resource. Actions may be performed on connection resources. Such actions are used to setup and tear down the connections defined by the properties of the connection resource under program control. An interactive application may also obtain the status of an existing connection associated with a connection resource. This connection could be a TCP or UDP socket, an HTTP connection, or, for example a packet delivered over a QPSK modulated out-of-band data channel using a method such as ALOHA. It could be a connection over a modem and phone line (for instance, for use with a DTH platform) or a dedicated return data channel as is the case with a cable platform.

Table 7 describes a list of attributes defined by a connection resource according to one embodiment of the invention.

TABLE 7

| Parameter | Description | Syntax |
| --- | --- | --- |
| Server URL | Standard URL for the Server for this connection. The URL can describe the networking protocol used to communicate with the server (i.e. http, udp, tcp, ALOHA, etc.) | string |
| Authentication URL | URL of server to authenticate set-top (i.e. if there is an intermediary server required to authenticate the transaction) | string |
| Phone Number | Default Phone Number | string |
| Retry Count | Number of times to repeat call (excluding first attempt) | uint8 |
| Alternate Number | Alternate Phone Number (Ring on Busy) | string |
| Minimum Baud Rate | Minimum baud rate at which a connection should be attempted | string |
| Maximum Baud Rate | Maximum baud rate at which a connection should be attempted | string |
| Idle Timeout | Number of seconds after which to hang up idle line | uint8 |
| Call Cost | String to be displayed to subscriber representing cost of call | string |
| No Dialtone Message | String to be displayed to subscriber in the event that modem detects no dial tone | string |
| Authentication Failure Message | String to be displayed to subscriber in the event that set-top authentication fails | string | e. Widget Dictionary Resource

According to one embodiment, the visual elements of an interactive application are defined as widget dictionary resources. A widget dictionary resource maps widget property names to UIDs.

According to one embodiment of the invention, widgets possess both visual and behavioral attributes. Visual attributes govern how the widget is displayed, and behavioral attributes describe sequences of actions to be executed based on events that occur when those widgets are displayed.

Table 8 describes a list of widget attributes that are defined by the ADL according to one embodiment of the invention. When translating a widget construct to a binary format, the interchange formatting system 127 translates each parameter to an associated binary value. In this regard, only required symbols need to have values for the widget to be considered to be in compliance with the interchange format. For example, a widget name is a symbol that requires an express value. If a non-required value is not provided for a symbol, the execution engine 133 utilizes the default value stored in the memory 140.

TABLE 8

| Parameter | Description | Syntax |
| --- | --- | --- |
| Height | Height of the widget expressed as a percentage (0 ≦ 1) of its parent's height | float |
| Width | Width of the widget expressed as a percentage (0 ≦ 1) of its parent's width | float |
| X Position | Position of the top-left-most corner of the widget along the horizontal axis expressed as a percentage (0 ≦ 1) of its parent's width | float |
| Y Position | Position of the top-left-most corner of the widget along the vertical axis expressed as a percentage (0 ≦ 1) of its parent's height | float |
| Z Order | The rendering order with respect to the other children of the parent container widget, where children at the front of the list (i..e. 0 or 1) can potentially be obscured by children at the rear of the list (i.e. 3 or 4) | uint32 |
| Event Table | An EventTableResource containing a table of events and their corresponding action lists to be executed when the events occur when the widget has focus | ResourceUID |
| Initial Visibility | Whether or not the widget's elements are rendered when its parent widget is given focus. | uint32 where 0 = no; 1 = yes |
| Participate In Grid | Whether or not the widget participates in the grid of its parent widget | boolean |
| Dictionary Elements: Appearance | | |
| Inactive Background Color | Background color of the widget when it does not have focus | color |
| Active Background Color | Background color of the widget when it is active but is not selected | color |
| Inactive Selected Background Color | Background color of the widget when it has been selected but is no longer active | color |
| Active Selected Background Color | Background color of the widget when it is active and is the current element selected. | color |
| Armed Background Color | Background color of the widget to indicate that it has been selected | color |
| Inactive Border Color | Border color of the widget when it does not have focus | color |
| Active Border Color | Border color of the widget when it is active but is not selected | color |
| Inactive Selected Border Color | Border color of the widget when it has been selected but is no longer active | color |
| Active Selected Border Color | Border color of the widget when it is active and is the current element selected. | color |
| Armed Border Color | Border color of the widget to indicate that it has been selected | color |
| Border Width | Width of the border in pixels | uint32 |
| Promote Own Attributes | A reference to the UID of a ContextualAttributesResource which maps contextual widget property names to UIDs. | ResourceUID |
| Vertical Contents Alignment | The alignment of contents along a vertical axis. | uint32 where: 0 = "Left"; 1 = "Center"; 2 = "Right" |
| Horizontal Contents Alignment | The alignment of contents along a horizontal axis. | uint32 where: 0 = "Top"; 1 = "Middle"; 2 = "Bottom" |
| Horizontal Inset | Horizontal margin for the container's contents | uint32 |
| Vertical Inset | Vertical margin for the container's contents | uint32 |

Of the parameters listed in Table 8, some attributes, such as name, UID, coordinates, and size, are common to all widgets. Widget sub-classes have attributes and elements that are specific to their nature. A widget sub-class may be, for example, an image widget, a text widget, a text entry widget, a video widget, a mask widget, a "bug" widget, or a container widget.

Image widgets define different images represented via image resources for various navigational states of the widget. Text widgets define different texts represented via string resources, the font of the text represented via font resources, and colors, for various navigational states of the widget. Text entry widgets include the parameters of a text widget, and further define text to be entered by a viewer represented via a string resource, the text type, the length, and the like. Mask widgets define the display of video overlay masks. Bug widgets are used to display an image to the user to indicate the presence of interactive content during an enhanced program.

Video widgets describe how motion imagery is displayed and controlled as part of the display of interactive content. An application author may utilize video widgets to express scaled video size and the location or color that is to fill the screen in place of video. Video widgets may also be used to tie into VOD libraries and enable switching between multiple video/audio streams.

Container widgets contain subsets of child widgets. Child widgets may be either core resources, such as images or text, or may themselves be container widgets. FIG. 8 illustrates an exemplary container widget resource XML document according to one embodiment of the invention. The resource indicates a resource type 360 and a version 361 of the ADL specification used to generate the resource. The resource further includes a resource UID 362 allocated to the resource, a resource name 364, and a count 366 of elements contained in the resource.

Because a container widget resource is a type of dictionary resource, the elements contained in the resource are identified by a "DictItem" type 368. In the illustrated example, the various entries in the container widget resource map symbol names 370 to UID values 372. One such mapping is a mapping of a "field list" parameter 374 to a UID 376 of a field list resource that includes a list of all child elements within the container. A field resource in turn maps a child widget's UID to a contextual attributes resource UID which is described in further detail below.

Container widgets allow widgets to be grouped into parent/child hierarchies. Container widgets function as parents to other child widgets. Container widgets may also contain other container widgets to enable the creation of elaborate widget hierarchies. Through this structure, child widgets may inherit properties, such as, for example, relative positioning properties, based on their parent. Child widgets may also pass events to their parent such that if the child widget receives an event that has not been specified, it can pass it back to its parent who may have an entry for the event in its event table.

Figure 9A:
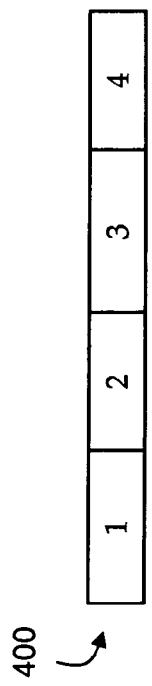
FIG. 9A illustrates a navigation grid with four columns and one row according to one embodiment of the invention.
Figure 9B:
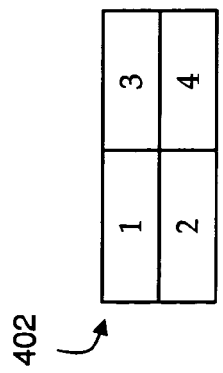
FIG. 9B illustrates a navigation grid with one column and four rows according to one embodiment of the invention.
Figure 9C:
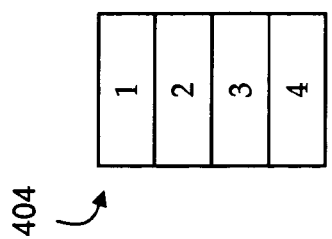
FIG. 9C illustrates a navigation grid with two columns and two rows according to one embodiment of the invention.

Container widgets further specify the navigation of the child elements in the container. Navigation of the child elements may be expressed using a navigation grid. A navigation grid allows a description of the traversal of multiple visual elements in a manner consistent with an intuitive user interface design. Typically when shown a horizontal sequence of navigable visual elements, such as grid 400 illustrated in FIG. 9A with four columns and one row, a viewer will assume that by using their "left" and "right" remote control buttons they will be able to traverse the visual elements in the order they are displayed. Similarly, when shown a vertical sequence of navigable visual elements, such as grid 402 illustrated in FIG. 9B with one column and four rows, a viewer will assume that using their "up" and "down" remote control buttons will enable them to traverse the elements in display order. Additionally, when shown a sequence of navigable visual elements that occupy more than one column and row, such as grid 404 illustrated in FIG. 9C with two columns and two rows, the viewer assumes that they can navigate to element 2 from element 1 by pressing the "down" remote control button, and can navigate to element 3 from element 1 by pressing the "right" button.

To enable this navigation paradigm for its navigable child widgets, a container widget defines a number of columns 378 and/or rows 380 of its child widgets. The container widget further maps a navigation list 374 parameter to a UID 376 of a navigation order resource which contains a list of the navigable child elements in the navigation order. The container widget further includes a default focus 382 parameter indicating the position of the child element in the navigation list that is given focus as a default when the widget is rendered.

According to one embodiment, widgets are said to have focus when they are clearly visible to the viewer, and they are affected by the viewer's actions, such as remote control button presses.

Widgets are attributed certain navigation states which express their relationship to viewer interaction activity and whether or not they or their containers have focus. According to one embodiment of the invention, certain widget properties, including colors, text and images, are designated to change to indicate their state to the viewer. On-screen navigation may be fully described using combinations of these visual and behavioral states.

The navigation states defined by the ADL include, but are not limited to, inactive, active selected, active, and inactive selected states. According to one embodiment, the inactive state is the base state for all widgets. According to a further embodiment, if properties for other states are not specified, inactive state properties trickle down to the other states.

Figure 10A:
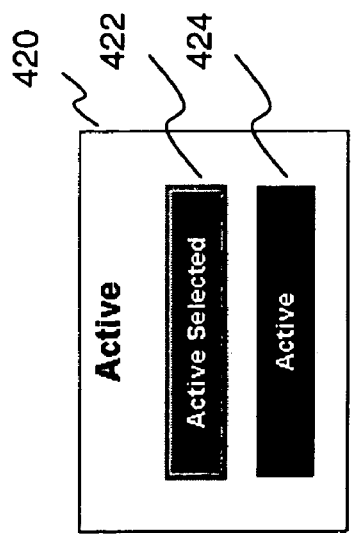
FIG. 10A is a screen shot of a container widget according to one embodiment of the invention.

A widget is in an active selected state when the widget has focus, and is the widget that is affected when the viewer presses remote control keys or actuates some other input device 135. When a widget has focus, the widget's parent layout or container, plus any widgets with the same parent, are in their active state. FIG. 10A is a screen shot of a container widget 420 including child widgets 422 and 424. Widget 422 is in an active selected state, and widget 424 is in an active state.

Figure 10B:
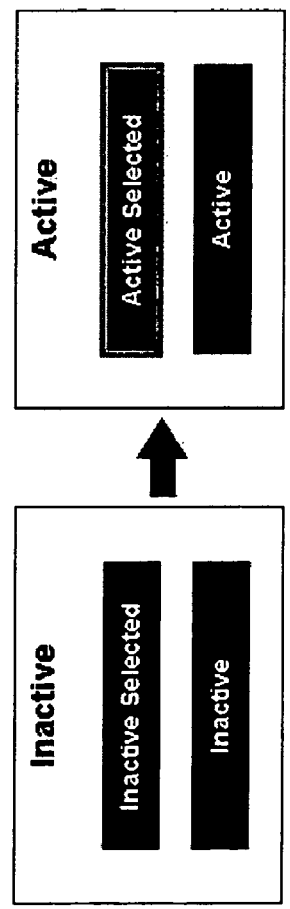
FIG. 10B is a screen shot of a container widget transitioning to an inactive state according to one embodiment of the invention.

When a first widget is in an active selected state, and the viewer moves to and begins navigating within another container with a second widget, the first widget transitions to an inactive selected state. The inactive selected widget is the last widget to have focus before the viewer moves out of that container. The first widget's container and any widgets with the same parent also transition to the inactive state, as is illustrated in FIG. 10B.

A user-selected widget momentarily transitions to the armed state. The armed state provides instant feedback to the selecting viewer, such as for example, the generating of a display.

f. Contextual Attributes Dictionary Resource

A contextual attributes resource is a dictionary resource which is used primarily to describe child widgets in the context of their parent widget. For example, a child widget's height and width may respectively be described as a percentage of the parent's height and width. As described above with reference to FIG. 8, a container widget resource lists its child widgets via the field list parameter 374 that is mapped to a field list resource which in turn maps the UID of each child widget to a contextual attributes resource. The contextual attributes resource in turn has a list of properties that reference the child's parent.

The contextual attributes construct affords a number of efficiencies in the creation and delivery of interactive television assets. For example, a number of resources that have many common properties may be implemented as a single resource with the differences contained in the contextual attributes resource of each instance of the resource. For instance, consider a tic-tac-toe grid of image widget resources which can be set to either an "X" or "O" image. Rather than having nine individual image widget resources with different coordinates, they can be implemented as a single tic-tac-toe board image widget resource containing all common presentation and behavior properties. The container widget for the tic-tac-toe board will have nine children in its field list, each of which is a mapping of the resource UID of a single tic-tac-toe square image widget resource to a different contextual attributes resource containing different coordinates on the tic-tac-toe board.

FIG. 11 illustrates an exemplary XML document for a container widget resource, field list resource, and contextual attributes resource according to one embodiment of the invention. The illustrated container widget resource 450 includes a field list parameter with a UID 452 of a corresponding field list resource 454. The identified field list resource 454 includes UIDs 456, 458 which identify the contextual attribute resources for two child widgets. A contextual attributes resource 460 for a first child widget provides a list of UID values 462 relating to the child widget's x-coordinate position, y-coordinate position, width, height, initial visibility, z-order, and the like.

g. Event Table Dictionary Resource

An event table dictionary resource maps event names to UIDs of action list resources. Event table resources are referenced by widget resources, and indicate the actions to be executed when the listed events occur when the widget has focus. According to one embodiment of the invention, events are stimuli generated from an operation external to the execution of an interactive television program, such as, for example, a user's remote control button press or the expiration of a timer.

FIG. 12 illustrates an exemplary event table resource XML document according to one embodiment of the invention. In the illustrated example, the listed events are four number keys 500 on the remote control which are mapped to UIDs 502 of corresponding action lists.

2. UID Vector Resources

A UID vector resource includes a list of single UIDs. Elements in a UID vector resource are identified by a "UIDReference" type. The various types of UID vector resources include action list resources, argument list resources, and navigation order resources.

Table 9 describes an interchange format adhered by the interchange formatting system 127 for translating a UID vector resource into a compressed representation according to one embodiment of the invention.

TABLE 9

UIDVector Resource

| Syntax | Number of bits | Format |
|---|---|---|
| UIDVectorResource( ) { | | |
| ResourceHeader( ) | | |
| UIDVectorSize | 32 | uimsbf |
| for (i = 0; i < UIDVectorSize; i++) { | | |
| uid | 64 | uimsbf |
| } | | |
| } | | |

UIDVectorSize: a 32-bit identifying a number of UIDs in the UID vector resource.
uid: 64-bit specifying a value or UID.

a. Action List Resource

An action list resource is referenced by an event table resource that maps an event name to a UID of the action list resource. The event table resource is in turn included in a widget resource.

An action list resource includes a non-resource UID identifying a particular action followed by one or more operands upon which the action operates. The operands may be UIDs associated with widgets, widget properties, variables, or literals. The operations performed by the actions may be branching actions, null actions, widget actions, variable operations, time-related actions, or connection actions.

A branching action transfers execution to another action list under control of the interactive program. All branches immediately terminate execution of the current action list and continue execution at the beginning of the new action list. According to one embodiment of the invention, a branching action may be a conditional branch action that continues execution in one of two action lists depending on a value of a Boolean condition.

A null action is one that has no effect on the interactive program.

A variable operation modifies a single variable or a single property of an existing widget. It computes a simple expression involving variables or properties and assigns the result to another variable or property.

FIG. 13 illustrates an exemplary action list resource XML document according to one embodiment of the invention. The illustrated action list identifies an "assign" variable action 510 followed by two symbol/UID pairs 512-518. The "assign" action sets the value of a first UID 514 referenced by a first symbol 512, to be the same value of a second UID 518 referenced by a second symbol 516.

The illustrated action list also includes a "got to" branching action 520 which causes the program to continue execution in an action list identified by a UID 522.

A widget action modifies relationships among the widgets, as opposed to modifying properties of individual widgets via variable operations. For example, a widget action may effect the containment relationship of the widgets, that is, may determine which widgets contain other widgets. In another example, a widget action may determine which widget has focus, and thus, is a recipient of events.

Table 10 provides a list of widget actions and associated codes specified by an interchange format adhered by the interchange formatting system 127 according to one embodiment of the invention.

TABLE 10

| Name | Code | Description |
| --- | --- | --- |
| ADD_WIDGET | $001_{16}$ | Adds a widget to a container. |
| DESTROY_WIDGET | $002_{16}$ | Removes a widget from its parent container and releases all associated resources. |
| REPLACE_WIDGET | $003_{16}$ | Replaces a widget in a container with a new widget. |
| HIDE_WIDGET | $004_{16}$ | Makes a widget and all its children invisible and unable to receive focus. |
| SHOW_WIDGET | $005_{16}$ | Makes a widget and all its children visible and able to receive focus. |
| GIVE_FOCUS | $006_{16}$ | Pushes the specified widget on the focus stack. |
| POP_FOCUS | $007_{16}$ | Undoes pushing the specified widget on the focus stack and all subsequent operations. |
| CALL | $008_{16}$ | Pushes the specified Item on the focus stack and waits for a value from a RETURN action in that Item. |
| RETURN | $009_{16}$ | Undoes pushing the uppermost Item on the focus stack and all subsequent operations, then supplies the specified return value to the waiting CALL action. |
| POP_TO_ROOT | $00A_{16}$ | Pops the entire contents of the focus stack, returning all widget relationships to their initial state. |

A time-related action is one that reads and sets attributes related to time.

Table 11 provides a list of time-related actions and associated codes specified by an interchange format adhered by the interchange formatting system 127 according to one embodiment of the invention.

TABLE 11

| Operation | Name | Code | Description |
| --- | --- | --- | --- |
| y Π startTimer x, t0 = a1, tN = a2, data = a3 | START_TIMER | $A01_{16}$ | Associates a timer process x to a variable y, along with an initial timeout value a1, a timeout interval a2, and optional timer data a3 |
| stopTimer y | STOP_TIMER | $A02_{16}$ | Stops the time process y |
| a Π getRemainingTimer Time y | GET_REMAINING_TIMER_TIME | $A03_{16}$ | Sets a to be the time remaining in timer variable y before the timer has its next timeout event, in milliseconds |
| y Π ExpiredTimer | GET_EXPIRED_TIMER | $A04_{16}$ | Sets y to the instance of the expired timer |
| y Π ExpiredTimerData | GET_EXPIRED_TIMER_DATA | $A05_{16}$ | Sets y to be the data associated with the expired timer |
| y Π ApplicationRunTime | GET_APPLICATION_RUN_TIME | $A06_{16}$ | Sets y to be the time in milliseconds that has elapsed since the start of the application |
| y Π DateTimeString | GET_DATE_TIME_STRING | $A07_{16}$ | Sets y to be the current date and time |

Connection actions are used to setup, destroy, or manage and tear down a connection from the execution engine environment to an external server defined by a connection dictionary resource under control of the interactive program. The interactive program may also obtain the status of an existing connection associated with a connection resource.

Table 12 provides a list of connection actions and associated codes specified by an interchange format adhered by the interchange formatting system 127 according to one embodiment of the invention.

TABLE 12

| Operation | Name | Code | Description |
|---|---|---|---|
| Connection | | | |
| connect c | CONNECT | $B01_{16}$ | Establish a new connection to the server specified by Connection Resource c |
| shutdown c | SHUTDOWN | $B02_{16}$ | Shutdown the connection specified by Connection Resource c |
| s ←getstatus c | GETSTATUS | $B03_{16}$ | Get the status of the connection specified by Connection Resource c |
| on_error c, a | ON_ERROR | $B04_{16}$ | Execute action list a whenever an error is detected in an operation on Connection Resource c | b. Argument List Resource

An argument list resource defines a list of scalar non-resource UID values which act as arguments for another resource. An exemplary resource that references an argument list resource is a back end dictionary resource. The argument list in a back end dictionary resource defines, for example, a list of arguments that is passed between the execution engine 133 and a remote function running on a response server. According to one embodiment, each UID in the list of arguments conveys both the type required by the corresponding actual argument when the remote function is actually invoked, and a default value for use in constructing the actual argument list.

FIG. 14 illustrates an exemplary XML document for a back end service resource and an argument list resource according to one embodiment of the invention. The back end service resource 600 includes a return type 602 which is mapped to a UID 604 of a resource which defines the type of value returned by the remote function. The back end service resource also includes an argument list 606 which is mapped to a UID 608 of an argument list resource 610. The argument list resource 612 defines two scalar UID values 614, 616 to be passed to the remote function.

c. Navigation Order Resource

A navigation order resource is referenced by a container widget and includes a list of navigable child widgets in their navigation order. According to one embodiment of the invention, the order of the UIDs within the navigation order resource referencing the child widgets determines the sequence in which the child widgets will be traversed.

FIG. 15 illustrates an exemplary XML document for a container widget resource and navigation order resource according to one embodiment of the invention. The container widget resource 650 includes a navigation list mapped to a UID 654 of a navigation order resource 654. The navigation order resource 654 lists UIDs 658 of child widgets within the container that are meant to be navigated by the user. The order of the UIDs 658 within the navigation order resource 656 determines the sequence in which the widgets will be traversed.

3. UID Pair Vector Resources

A UID pair vector resource lists UID pairs, and includes elements having a "UIDReferencePair" type. A field list resource is a type of UID pair vector resource.

FIG. 16 illustrates an exemplary field list resource XML document according to one embodiment of the invention. The field list resource associates a UID 700 of each widget in a parent container with a UID 702 that references a contextual attributes resource. The contextual attributes resource describes attributes for the child widget that are relative to the parent container.

Table 13 describes an interchange format adhered by the interchange formatting system 127 for translating a UID pair vector resource into a compressed representation according to one embodiment of the invention.

TABLE 13

UID Pair VectorResource

| Syntax | Number of bits | Format |
|---|---|---|
| UIDPairVectorResource( ) { | | |
|   ResourceHeader( ) | | |
|   UIDPairVectorSize | 32 | uimsbf |
|   for (i = 0; i < UIDPairVectorSize; i++) { | 64 | uimsbf |
|     uidFirst | | |
|   } | | |
|   for (i = 0; i < UIDPairVectorSize; i++) { | 64 | uimsbf |
|     uidSecond | | |
|   } | | |
| } | | |

UIDPairVectorSize: a 32-bit value identifying the number of UIDs in the UIDPairVectorResource.
uidFirst: a 64-bit value specifying the first value or UID in every pair.
uidSecond: a 64-bit value specifying the second value or UID in every pair.

4. Image, String, and Font Resources

According to one embodiment of the invention, image, string, and font resources are fundamental constructs for interactive television applications. A font resource references fonts resident on the client 106 and running the execution engine 133 used to display text strings.

An image resource describes an image and contains its data. Each image consists of a rectangular array of pixels. According to one embodiment of the invention, each pixel contains four 8-bit values [α, R, G, B] representing, respectively, alpha (opacity), red, green, and blue components of the color in the fractions [α/255, R/255, G/255, B/255]. The alpha component is stored in the most-significant octet, and the blue component in the least-significant octet. The pixels are expressed in scanline order from left to right.

A string resource contains text strings with corresponding formatting information that may be rendered in a text widget. According to one embodiment of the invention, a hypertext markup language (HTML) format may be used to describe the string information, such as, for example, formatting and positioning information. In this case, the client 106 includes an HTML rendering engine for rendering the text.

C. Commands

According to one embodiment of the invention, commands allow an audio-visual program to be enhanced with interactive content that is synchronized to events within the program. In this regard, commands are stored in the event queue 138 and retrieved by the execution engine 133 when the start time of the command is reached. The start time of the command is computed based on a time provided by the time source 136.

1. Pop-Up Command

A pop-up command instructs the execution engine to display an associated widget at the specified time and for the specified duration after which it is to be removed from the display. According to one embodiment, the widget is displayed on top of an existing root item, that is, an item that may always be accessed, such as, for example, a static menu.

Table 14 provides a list of elements of a pop-up command as defined by the ADL according to one embodiment of the invention.

TABLE 14

| Attributes | Description | Syntax |
|---|---|---|
| startCode | Start timecode (in frames) in a "timed" production when the resource should be displayed. (optional) | "$a_1:a_2:a_3.a_4$" where $0 \leq a_1 \leq 24$, $0 \leq a_2 \leq 60$ $0 \leq a_3 \leq 60$ $0 \leq a_4 < 30$; $a_1, a_2, a_3, a_4$ are uint8 |
| uid | UID of the widget to be displayed | ResourceUID |
| platform | A particular target platform (optional) | string |
| duration | Duration (in frames) that the widget should be displayed on screen | uint32 |

Example

The following is an example of a PopUpCommand:
<PopUpCommand startCode="01:04:15.00" uid="E200000000006739" platform="Platform: Common"duration="420" />
</PopUpCommand>

Table 15 describes an interchange format adhered by the interchange formatting system 127 for translating a pop-up command into a compressed format according to one embodiment of the invention.

TABLE 15

| Popup Command | | |
|---|---|---|
| Syntax | Number of bits | Format |
| PopUpCommand( ) { | | |
|   CommandHeader( ) | | |
|   duration | 32 | uimsbf |
|   optUID | 64 | uimsbf |
| } | | | duration: a 32-bit value representing a duration of the popup in terms of frames.
optUID: 64-bit UID of the interaction to superimpose over the root interaction at the given time (in the command header), for the given duration.

Table 16 describes an interchange format adhered by the interchange formatting system 127 for generating a command header according to one embodiment of the invention.

TABLE 16

| Command Header | | |
|---|---|---|
| Syntax | Number of bits | Format |
| CommandHeader( ) { | | |
|   commandType | 8 | uimsbf |
|   reserved1 | 8 | uimsbf |
|   reserved2 | 8 | uimsbf |

TABLE 16-continued

| Command Header | | |
|---|---|---|
| Syntax | Number of bits | Format |
|   reserved3 | 8 | uimsbf |
|   startTime | 32 | uimsbf |
| } | | | commandType: an 8-bit value identifying the command.
reserved: reserved for future standardization, and set to all '0' bits.
startTime: a 32-bit time reference at which to execute the command.

The bytes that follow the header are interpreted by the parsing execution engine 133 according to the commandType. The start of the next object in the byte stream is aligned to the next 4 byte boundary after the end of the command data.

2. Make Root Command

A make root command instructs the execution engine to replace a root item with a new rot item that is referenced by a UID.

Table 17 provides a list of elements of a make root command as defined by the ADL according to one embodiment of the invention.

TABLE 17

| Attributes | Description | Syntax |
|---|---|---|
| startCode | Start timecode (in frames) in a "timed" production when the item should be made the new root item. | "$a_1:a_2:a_3.a_4$" where $0 \leq a_1 \leq 24$, $0 \leq a_2 \leq 60$ $0 \leq a_3 \leq 60$ $0 \leq a_4 < 30$; $a_1, a_2, a_3, a_4$ are uint8 |
| uid | UID of the new root item | ResourceUID |
| platform | A particular target platform (optional) | string |
| endCode | End timecode (in frames) in a "timed" production when the item should no longer be the root item (optional) | "$a_1:a_2:a_3.a_4$" where $0 \leq a_1 \leq 24$, $0 \leq a_2 \leq 60$ $0 \leq a_3 \leq 60$ $0 \leq a_4 < 30$; $a_1, a_2, a_3, a_4$ are uint8 |

Example

The following is an example of a MakeRootCommand:
<MakeRootCommand startCode="00:05:15.00" uid="E200000000007039" platform="Platform:Common" />
</MakeRootCommand>

Table 18 describes an interchange format adhered by the interchange formatting system 127 for translating a make root command into a compressed format according to one embodiment of the invention.

TABLE 18

| Make Root Command | | |
|---|---|---|
| Syntax | Number of bits | Format |
| MakeRootCommand( ) { | | |
|   CommandHeader( ) | | |
|   expirationTime | 32 | uimsbf |
|   optUID | 64 | uimsbf |
| } | | | expirationTime: a 32-bit time reference of the root's expiration.
optUID: a 64-bit UID of the interaction to be set as the root at a time given in the command header.

3. Change Command

A change command instructs the execution engine to change the UID of a specified "gensym" entry in an item's OPT resource with a new UID. This command may be used to update dynamic values, such as, for example, a string containing the latest news headline, or values that are set to change at pre-specified times, such as, for example, certain string of lyrics during an interactive karaoke application.

Table 19 provides a list of elements of a change command as defined by the ADL according to one embodiment of the invention.

TABLE 19

| Attributes | Description | Syntax |
|---|---|---|
| startCode | Start timecode (in frames) in a "timed" production when the OPT should be updated. (optional) | "$a_1{:}a_2{:}a_3.a_4$" where $0 \leq a_1 \leq 24$, $0 \leq a_2 \leq 60$ $0 \leq a_3 \leq 60$ $0 \leq a_4 < 30$; $a_1, a_2, a_3, a_4$ are uint8 |
| changedictref | UID of the OPTResource with the entry to be updated | ResourceUID |
| gensym | Name of the entry in the OPTResource that is being updated | string |
| newuidref | UID of the new resource to be associated with the entry | ResourceUID |

Example

The following is an example of a ChangeCommand:
<ChangeCommand startCode="00:00:38.01"
changedictref="E00210000003F2D7" gensym="1000099"
newuidref="E002100000043DB0">
</ChangeCommand>

Table 20 describes an interchange format adhered by the interchange formatting system 127 for translating a change command into a compressed representation according to one embodiment of the invention.

TABLE 20

| Syntax | Number of bits | Format |
|---|---|---|
| ChangeCommand( ) { | | |
|   CommandHeader( ) | | |
|   optUID | 64 | uimsbf |
|   symbol | 32 | uimsbf |
|   newUID | 64 | uimsbf |
| } | | | optUID: a 64-bit UID of the OPT resource to modify at a time given in the command header.
symbol: a 32-bit value associated with a symbol name within the OPT whose associated UID is changing to a new UID.
newUID: a 64-bit new UID value of the symbol.

4. Trailer Object Command

A trailer command instructs the execution engine to designate a particular resource identified by its UID as a trailer object, and displays that resource until a primary application, or root track, is fully loaded. According to one embodiment of the invention, the trailer object is a resource that is relatively small in size, broadcast often, and displayed as soon as it is received as an introduction or trailer, while the rest of the root track, which is generally much larger than the trailer object, is being loaded into memory.

Table 21 provides a list of elements of a trailer command as defined by the ADL according to one embodiment of the invention.

TABLE 21

| Attributes | Description | Syntax |
|---|---|---|
| uid | UID of the resource to be given "TrailerObject" status | ResourceUID |

Example

The following is an example of a TrailerObjectCommand:
<TrailerObjectCommand uid="0006000000169152">
</TrailerObjectCommand>

Table 22 describes an interchange format adhered by the interchange formatting system 127 for translating a trailer command into a compressed representation according to one embodiment of the invention.

TABLE 22

TrailerObject Command

| Syntax | Number of bits | Format |
|---|---|---|
| TrailerObjectCommand( ) { | 64 | uimsbf |
|   CommandHeader( ) | | |
|   optUID | | |
| } | | | optUID: a 64-bit UID of the interaction to make the root while loading the main application.

The ADL according to the above-described embodiments of the present invention is advantageous in that it is platform-independent, although certain data structures may be specified as platform-specific, allowing the language to the used for generating ITV applications for different platforms via a single authoring tool.

The core data structure types provided by the ADL (i.e. dictionaries, UID vectors, UID pair vectors, images, strings, and fonts) allow new constructs to be generated or existing constructs to be extended by simply combining the core data structure types. For example, one or more symbols may be added to a dictionary resource to define a new interactive object. The extension or generation of new constructs may be done without change to the input parsing, transformation to the compressed format, and compressed format parsing. Furthermore, the limited number of core data structure types call for a storage size that is smaller than systems with a large number of specialized constructs.

In the prior art, adding new functionality to an interactive object generally entails changing the object definition within a user agent, or defining an entirely new object. This may entail adding new constructs to the language by changing existing structures (and subsequently, version numbers) or defining new structures. This in turn may cause changes in many areas in the code base such as, for example, XML parsing, formatting, data consumption on the user agent, and the like. Furthermore, the range of functionalities that may be expressed by the use of a fixed set of highly specialized objects is limited to those for which the objects were tailored.

The ADL according to the above-described embodiments also provide widget structures with parent-child relationships that allow inheritance of attributes and/or behaviors and re-use of data elements, reducing required transmission bandwidth and storage space.

The constructs generated using the ADL are also of variable length, and only contain values that differ from the default values maintained by the client. This may be contrasted with prior art constructs which are generally of fixed length, and contain all of the construct's attributes, resulting in more memory usage. An update or override in the prior art of any of these attributes would generally require the re-sending of the entire construct.

The constructs defined by the ADL are referenced by UIDs which indicate the memory locations in which the constructs are stored. This differs from a tabular approach of the prior art where data is stored in tables with rows and columns. Because rows and columns are of fixed length, and images and many other data types vary in size, padding is generally required to accommodate images and data of a large size, wasting bandwidth and memory resources.

The ADL according to the various embodiments also allows efficient memory management via expiration timestamps that indicate when an associated resource may be freed from memory. Given the highly dynamic nature of enhanced television, marking resources with expiration timestamps allow the execution engine 133 to efficiently manage its memory 140 to make room for incoming resources.

Furthermore, the module construct provided by the ADL allows objects to be grouped for specific platforms. The header information at the start of the module that quickly identifies the application, the profile, and the platform (if applicable) to which the module's content pertains allows the execution engine 133 to quickly evaluate the relevance of an incoming module and choose to ignore it if it is not relevant.

The profile-specific module approach lends itself well to splitting profile-specific modules across multiple profile IDs, where all execution engines may first tune to a profile ID containing modules common across all profiles, and might then tune to a profile ID containing modules specific to its profile. This helps decrease the amount of loading time for an application given that the execution engine will no longer need to wait while modules are arriving that are of no relevance to it before it gets to modules that are relevant, and if an execution engine tunes to a profile-specific stream, it will be able to start loading data immediately, without having to wait to evaluate whether the data is relevant or not.

Although this invention has been described in certain specific embodiments, those skilled in the art will have no difficulty devising variations to the described embodiment which in no way depart from the scope and spirit of the present invention. Furthermore, to those skilled in the various arts, the invention itself herein will suggest solutions to other tasks and adaptations for other applications. It is the applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. An interactive television (ITV) system comprising:
  an authoring tool generating an ITV application, the ITV application including presentation information for presenting ITV content, the presentation information being represented via a plurality of data structures built based on one or more predetermined data structure types, at least one of the plurality of data structures configured to include an attribute and value pair for defining a presentation parameter of the ITV content; and
  an execution engine receiving and executing the ITV application and the ITV content, the execution engine storing a plurality of default values for a plurality of attributes for defining default presentation parameters of the ITV content, the execution engine determining whether the at least one of the data structures includes one or more values for one or more of the plurality of attributes, and responsive to a determination that the at least one of the data structures includes the one or more values, retrieving the one or more values from the at least one of the data structures instead of the corresponding default values for presenting the ITV content.

2. The system of claim 1, wherein the ITV application includes behavior information describing how the application behaves in response to an external event, the behavior information being stored in a data structure separate from the data structure storing the presentation information.

3. The system of claim 1, wherein the plurality of data structures are of variable length.

4. The system of claim 1, wherein each data structure is referenced by a unique identifier associated with a memory location for the data structure.

5. The system of claim 4, wherein a portion of the unique identifier uniquely identifies a creator of the data structure.

6. The system of claim 1 further comprising:
  an interchange formatting system parsing the ITV application and generating a compact representation of the ITV application prior to delivery to the execution engine.

7. The system of claim 6, wherein the compact representation is a binary representation.

8. The system of claim 1, wherein a first of the plurality of data structures inherits properties associated with a second of the plurality of data structures.

9. The system of claim 8, wherein the plurality of data structures are packaged into a module having header information.

10. The system of claim 9, wherein the execution engine examines the header information for determining a relevance of the module to the execution engine.

11. The system of claim 8, wherein the plurality of data structures are packaged into a module catered to a particular platform of a receiving client.

12. The system of claim 8, wherein the plurality of data structures are packaged into a module catered to a particular profile of a receiving client.

13. The system of claim 1, wherein one of the plurality of data structures are built based on a dictionary data structure type that maps symbols to unique identifier values.

14. The system of claim 13, wherein a symbol is associated with an event, and the unique identifier value mapped to the event identifies an action data structure.

15. The system of claim 1, wherein the predetermined data structure types are building blocks for describing and organizing all ITV presentation and behavior information for any ITV content without introducing a new data structure type.

16. The system of claim 15, wherein the predetermined data structure types include a dictionary type for mapping symbols to values, wherein the values reference other data structures or contain scalar values.

17. The system of claim 16, wherein the predetermined data structure types include a unique identifier vector type for listing series of unique identifiers.

18. The system of claim 17, wherein at least one of the series of unique identifiers identify a particular action followed by one or more operands upon which the action operates.

19. The system of claim 17, wherein at least one of the series of unique identifiers identify one or more values that act as arguments for another resource.

20. The system of claim 17, wherein at least one of the series of unique identifier identify one or more navigable child widgets in their navigation order.

* * * * *

UNITED STATES PATENT AND TRADEMARK OFFICE
CERTIFICATE OF CORRECTION

PATENT NO. : 7,913,286 B2
APPLICATION NO. : 11/070698
DATED : March 22, 2011
INVENTOR(S) : Sarachik et al.

It is certified that error appears in the above-identified patent and that said Letters Patent is hereby corrected as shown below:

In Column 6, Line 59, delete "identifies" and insert -- identifiers --, therefor.

Signed and Sealed this
Eighth Day of November, 2011

David J. Kappos
*Director of the United States Patent and Trademark Office*